United States Patent [19]

Lasson

[11] Patent Number: 5,145,921
[45] Date of Patent: Sep. 8, 1992

[54] PROCESS FOR REDUCING THE FORMATION OF BUILDUP IN REACTORS DURING POLYMERIZATION OF VINYLIDENE FLUORIDE IN AN AQUEOUS SUSPENDING MEDIUM

[75] Inventor: Pierre Lasson, Brussels, Belgium

[73] Assignee: Solvay & Cie (Société Anonyme), Brussels, Belgium

[21] Appl. No.: 594,735

[22] Filed: Oct. 9, 1990

[30] Foreign Application Priority Data

Oct. 9, 1989 [FR] France ................ 89 13247

[51] Int. Cl.⁵ .............................................. C08F 2/20
[52] U.S. Cl. ...................................... 526/74; 526/200; 526/255
[58] Field of Search ................ 526/200, 255, 74

[56] References Cited

U.S. PATENT DOCUMENTS

| | | | |
|---|---|---|---|
| T953,008 | 12/1976 | Greminger, Jr. et al. | 526/200 |
| 3,553,185 | 1/1971 | Amagi et al. | 526/200 |
| 3,719,651 | 3/1973 | Greminger, Jr. et al. | 526/200 |
| 3,781,265 | 12/1923 | Dohany. | |

FOREIGN PATENT DOCUMENTS

| | | | |
|---|---|---|---|
| 0001397 | 4/1979 | European Pat. Off. . | |
| 2528950 | 1/1977 | Fed. Rep. of Germany | 526/200 |
| 4744032 | 7/1972 | Japan | 526/200 |
| 219473 | 9/1968 | U.S.S.R. | 526/200 |
| 1365590 | 9/1974 | United Kingdom | 526/200 |
| 1378875 | 12/1974 | United Kingdom | 526/200 |
| 1543431 | 6/1976 | United Kingdom . | |
| 2206122 | 12/1988 | United Kingdom . | |

Primary Examiner—Joseph L. Schofer
Assistant Examiner—N. Sarofim
Attorney, Agent, or Firm—Spencer, Frank & Schneider

[57] ABSTRACT

Polymerization of vinylidene fluoride in an aqueous suspending medium with the involvement of an oil-soluble radical polymerization initiator and in the presence of a suspending agent consisting of a methyl hydroxyethyl cellulose. The use of methyl hydroxyethyl cellulose ensures a substantial reduction in the formation of buildup on the walls of the reactors when compared with other cellulosic suspending agents such as methyl and methyl hydroxypropyl cellulose, which are usually recommended for the polymerization of vinylidene fluoride in an aqueous suspending medium.

10 Claims, No Drawings

PROCESS FOR REDUCING THE FORMATION OF BUILDUP IN REACTORS DURING POLYMERIZATION OF VINYLIDENE FLUORIDE IN AN AQUEOUS SUSPENDING MEDIUM

The present invention relates to a process for reducing the formation of buildup in reactors during polymerization of vinylidene fluoride in an aqueous suspending medium with the involvement of an oil-soluble radical polymerization initiator and in the presence of a suspending agent of the cellulose ether type.

It is known to polymerize vinylidene fluoride in an aqueous suspending medium with the involvement of an oil-soluble radical polymerization initiator and in the presence of a suspending agent of the cellulose ether type. Methyl cellulose and methyl hydroxypropyl cellulose may be mentioned as examples of cellulose ethers commonly recommended and employed as a suspending agent in vinylidene fluoride polymerization. The polymerization is generally carried out noncontinuously in reactor vessels provided with a bladed, sabre or turbine stirrer. In this known polymerization technique solid polymer deposits are produced during the polymerization, which are in the form of adherent films, on the internal surfaces of the reactors (vessels, stirrers, covers). In addition, polymer deposits are usually formed in the unstirred regions of the reactors, forming hard blocks (stalks) which have to be removed by manual scraping. This is the phenomenon known as "buildup formation". This buildup formation is potentially extremely damaging. In fact, the deposits on the vessel result in a reduction of the quantities of heat energy which it is possible to remove using the reactor jackets, resulting in a decrease in the production efficiency of the reactors. In addition, the deposits often fall off during polymerization and contaminate the polymers which are finally obtained.

Lastly, the formation of these deposits, which always appear in a random manner, makes the polymerization reactions more difficult to run and control.

This is why it is indispensable to clean the reactors very carefully between each polymerization cycle. This cleaning is usually performed by means of hot solvents, mechanical devices such as water lances, or else manually. It always involves an operation which is lengthy, arduous and costly in material, energy and labour.

Various means have already been proposed for reducing the formation of buildup in reactors during polymerization of vinyl and vinylidene monomers in aqueous medium. These means generally consist in coating the walls of reactors with buildup suppressors or incorporating them in the polymerization medium. In most cases these buildup suppressors have either a reducing effect or an inhibiting effect on radical polymerization. These means of the prior art additionally have the disadvantage of contributing to the contamination of the polymers produced.

The present invention provides a simple, efficient and economical process for reducing buildup formation in reactors employed for the polymerization of vinylidene fluoride in an aqueous suspending medium, which does not have the disadvantages of the processes of the prior art and which, in particular, do not contribute to the contamination of the resins which usually results from the incorporation in the polymerization medium of agents which are foreign to polymerization, and which does not affect the production efficiency of the reactors either.

To this end, the present invention provides a process for reducing the formation of buildup in reactors during polymerization of vinylidene fluoride in an aqueous suspending medium with the involvement of an oil-soluble radical polymerization initiator and in the presence of a suspending agent of the cellulose ether type, in which the suspending agent is a methyl hydroxyethyl cellulose.

A surprising effect of the present invention lies in the fact that the use of methyl hydroxyethyl cellulose as a suspending agent instead of the cellulose ethers usually recommended for the polymerization of vinylidene fluoride in an aqueous suspending medium provides a very appreciable reduction in the formation of buildup on the walls of the polymerization reactors, without in any way affecting the properties of the resulting vinylidene fluoride polymers or the production efficiency of the reactors.

Methyl hydroxyethyl celluloses are cellulose derivatives which are known per se. They are usually characterized by the average number of moles of methoxylating reactant combined with the cellulose per anhydroglucose unit, generally referred to by the abbreviation "D.S." (degree of substitution) and by the average number of moles of hydroxyethylating reactant combined with the cellulose per anhydroglucose unit, generally referred to by the abbreviation "M.S." (molar substitution).

The nature of the methyl hydroxyethyl celluloses is not particularly critical. Methyl hydroxyethyl celluloses which are particularly suitable for carrying out the process according to the invention are those which have a D.S. number ranging from 1.20 to 1.80 and an M.S number ranging from 0.10 to 0.30. Methyl hydroxyethyl celluloses which are very particularly preferred are those which have a D.S. number ranging from 1.40 to 1.60 and an M.S. number ranging from 0.13 to 0.27.

The quantity of methyl hydroxyethyl cellulose to be used in the process according to the invention is not critical. Even quantities as low as 0.05 parts per thousand by weight relative to the total quantity of monomer used provide a marked effect on the reduction in buildup formation. The increase in the concentration of methyl hydroxyethyl cellulose strengthens this effect further. However, insofar as concentrations which are equal to the usual concentrations of suspending agent are effective in substantially reducing or even eliminating the formation of buildup, it is generally recommended to employ the suspending agent according to the invention in a proportion of 0.1 to 5 parts per thousand and, still more particularly, in a proportion of 0.2 to 2 parts per thousand by weight relative to the total quantity of monomer used in the polymerization.

The viscosity of the methyl hydroxyethyl celluloses is not critical so far as their buildup-suppressing effect is concerned. It can therefore vary in very wide proportions. To give a more precise idea, methyl hydroxyethyl celluloses whose viscosity at 20° C. in an aqueous solution at a concentration of 2% ranges from 15 to 4000 mPa s can be used. Nevertheless, it has been found that the use of very viscous cellulose ethers can give rise to the appearance of fisheyes in the finished products. Because of this, preference is given to methyl hydroxyethyl celluloses whose viscosity at 20° C. in aqueous solution at a concentration of 2% does not exceed 1500 mPa s. Similarly, in order to avoid obtaining very fine particles, preference is given to methyl hydroxyethyl celluloses whose viscosity at 20° C. in aqueous solution at a concentration of 2% is at least 35 mPa s. Preference is therefore given to methyl hydroxyethyl celluloses whose viscosity at 20° C. in aqueous solution at a concentration of 2% is between 35 and 1500 mPa s and, still more particularly, between 50 and 1000 mPa s.

The way in which the methyl hydroxyethyl cellulose is used is not critical. It can all be used at the beginning of the polymerization or else, in parts, portionwise or continuously during the polymerization. All of the methyl ethyl hydroxy cellulose is preferably used at the beginning of the polymerization and, more particularly, by being introduced into the water before all the other ingredients of the polymerization (initiator, monomer, chain regulating agent if appropriate, and the like).

In the process according to the invention the polymerization can be initiated with the involvement of the usual oil-soluble initiators for the radical polymerization of vinylidene fluoride. Representative examples of such initiators are dialkyl peroxydicarbonates, acetyl cyclohexanesulphonyl peroxide, dibenzoyl peroxide, dicumyl peroxide, t-alkyl perbenzoates and t-alkyl perpivalates. Nevertheless, preference is given to dialkyl peroxydicarbonates such as diethyl and diisopropyl peroxydicarbonates and to t-alkyl perpivalates such as t-butyl and t-amyl perpivalates and, still more particularly, to t-alkyl perpivalates.

The initiator may all be used at the beginning of the polymerization or portionwise or continuously during the polymerization.

The quantity of oil-soluble initiator used in the polymerization is not critical. It is therefore possible to employ the usual quantities of an initiator, that is to say from approximately 0.05 to 3% by weight relative to the monomer used and, preferably, from approximately 0.05 to 2.5% by weight.

As stated above, the polymerization may be carried out in the presence of chain regulators. Examples of known chain regulators for polyvinylidene fluoride which may be mentioned are ketones containing from three to four carbon atoms, saturated alcohols containing from three to six carbon atoms, and dialkyl carbonates in which the alkyl groups contain up to five carbon atoms. When a chain regulator is employed, it is used in usual quantities. To give a more precise idea, the chain regulating agents are generally used in a proportion of approximately 0.5 to 5% by weight relative to the monomer used.

The polymerization temperature may be below or above the critical temperature of vinylidene fluoride (30.1° C.), the difference being of no importance. When the temperature is below 30.1° C. the polymerization takes place within a conventional aqueous suspension of liquid vinylidene fluoride at a pressure equal to the saturated vapour pressure of the vinylidene fluoride. When the temperature is above 30.1° C., it takes place within an aqueous suspension of gaseous vinylidene fluoride which is advantageously at elevated pressure. The process according to the invention can therefore be carried out at temperatures ranging from room temperature to approximately 110° C. Nevertheless, it is preferred to perform the polymerization at a temperature above 30.1° C. In accordance with a preferred embodiment of the process according to the invention the polymerization of the vinylidene fluoride is carried out at a temperature of between 35 and 100° C. and at initial pressures from approximately 55 to 200 bars. The production efficiency of the reactors can, of course, be increased by performing additional injections of monomer or of water during the polymerization, or by raising the polymerization temperature.

For the purposes of the present invention, polymerization of vinylidene fluoride is intended to refer to the homopolymerization of vinylidene fluoride and the copolymerization of mixtures of monomers with a predominant content of vinylidene fluoride, preferably higher than 85 mol %, such as, for example, mixtures of vinylidene fluoride with other fluoroolefins, such as vinyl fluoride, trifluoroethylene, chlorotrifluoroethylene, tetrafluoroethylene and hexafluoropropylene.

At the end of polymerization the vinylidene fluoride polymers obtained according to the process of the invention are isolated in a conventional manner by dewatering, followed by drying.

The process according to the invention makes it possible to reduce very substantially the formation of buildup in the reactors employed for the polymerization of vinylidene fluoride. This reduction in buildup formation is easily seen with the naked eye, by virtue of a superior glossiness of the walls. In the majority of cases it is possible to clean the reactor merely by washing it with a jet of water with a view to a subsequent polymerization, including the regions which are stirred poorly or not at all.

The examples which follow are intended to illustrate the process according to the invention. Examples 1, 2 and 6 illustrate the process of the invention. Examples 3 to 5 and 7 are given by way of comparison. In Examples 1, 2 and 6 methyl hydroxyethyl celluloses were used. In Example 3, for comparison, a methyl cellulose was used; in Example 4, for comparison, a methyl hydroxypropyl cellulose, and in Examples 5 and 7, also for comparison, an ethyl hydroxyethyl cellulose. The characteristics of the cellulose ethers used in Examples 1 to 7 are collated in Table I, appended. In the case of the ethyl hydroxyethyl celluloses the D.S. number represents the average number of moles of ethoxylating reactant combined with the cellulose per anhydroglucose unit.

EXAMPLES 1 TO 5

2480 g of demineralized water and 33 g of a solution of cellulosic dispersant at a concentration of 15 g/l, the nature and the viscosity of which are specified in Table I, appended, are introduced in succession into a 4-liter reactor fitted with a turbine-type stirrer and a jacket. The stirrer is started up at 880 rev/min. Most of the oxygen present in the reactor is removed by applying a vacuum of 40 mbar (at 15° C.) three times, pressure being restored to 1 bar with nitrogen after each evacuation. 2.50 g of tert-amyl perpivalate (initiator) and 33.44 g of diethyl carbonate (chain regulator) are then introduced. After 5 minutes, vinylidene fluoride is injected in quantities given in Table II under the heading initial $VF_2$, and the reactor is then heated gradually until a first temperature plateau of 52° C. is reached, which lasts for approximately three hours. The temperature is then raised to 65° C. and held at this value for two hours. Additional vinylidene fluoride is injected progressively during polymerization in quantities given in Table II and at such a rate that the pressure never exceeds 120 bars. At the end of polymerization the aqueous suspension is degassed (by lowering the pressure to atmospheric pressure) and the polymer is washed on a spin drier until the wash liquors no longer contain any foam. The polymer is dried to constant weight in an oven at 60° C. The total duration of the polymerization and the degree of conversion are given in Table II.

EXAMPLES 6 AND 7

2483 g of demineralized water and 44 g of a solution of cellulosic dispersant at a concentration of 15 g/l, the nature and the viscosity of which are given in Table I, are introduced in succession into a reactor identical with that described above. The stirrer is started up at 880 rev/min. Most of the oxygen present in the reactor is removed by applying a vacuum of 40 mbar (at 15° C.) three times, pressure being restored to 1 bar with nitrogen after each evacuation. 9.9 g of diethyl peroxydicarbonate (initiator functioning simultaneously as chain regulator) are then introduced. After five minutes, a single charge of 825 g of vinylidene fluoride is introduced and the reactor is then heated gradually until a first temperature plateau of 40° C. is reached, which lasts for 2 h 30 min. The temperature is then raised to 50° C. and is held at this value for 1 h 30 min. At the end of polymerization the aqueous suspension is degassed (by lowering the pressure to atmospheric pressure) and the polymer is washed on a spin drier until the wash liquors no longer contain any foam. The polymer is dried to constant weight in an oven at 60° C. The total duration of the polymerization and the degree of conversion are given in Table II.

The apparent packing density (APD), the mean particle size (MPS) and the intrinsic viscosity of the polyvinylidene fluorides produced according to Examples 1 to 7 appear in Table III, appended. The intrinsic viscosity $[\eta]$, expressed in l/g, was calculated from the specific viscosity, measured at 110° C., of a solution containing 2 g/l of polyvinylidene fluoride in dimethylformamide, according to the formula:

$[\eta]$ = limit of [specific viscosity/concentration C] for C=0

Inspection of the internal walls of the reactor after polymerization reveals that, in the case of Examples 1, 2 and 6, according to the invention, the walls are glossy and devoid of any adherent film. Merely washing with a jet of water is sufficient to clean the walls with a view to a subsequent polymerization. Similar polymerizations were successfully repeated about ten times before a thorough cleaning of the reactor was necessary. In the case of Examples 3 to 5 and 7, for comparison, inspection after polymerization reveals dull surfaces covered with a thin film of adherent polymer and stalks in the poorly stirred or unstirred regions, which have to be removed by thorough cleaning before it is possible to undertake a new polymerization.

Comparison of the results of Examples 1 and 2, according to the invention, with those of Examples 3 to 5, for comparison, on the one hand, and of Example 6, according to the invention, with those of Example 7, for comparison, on the other hand, shows adequately the effectiveness of methyl hydroxyethyl celluloses for substantially reducing the formation of buildup on the walls of the reactors without a marked influence on the properties of the polyvinylidene fluorides produced.

TABLE I

| Example No. | Cellulosic dispersant | | | Viscosity (20° C., 2% aq. sol.), mPa s |
|---|---|---|---|---|
| | Nature | D.S. | M.S. | |
| 1 | MHEC | 1.50 | 0.20 | 300 |
| 2 | MHEC | 1.50 | 0.20 | 50 |
| 3 | MC | 1.80 | 0 | 400 |
| 4 | MHPC | 1.80 | 0.13 | 50 |
| 5 | EHEC | 0.90 | 0.80 | 300 |
| 6 | MHEC | 1.50 | 0.20 | 300 |
| 7 | EHEC | 0.90 | 0.80 | 300 |

TABLE II

| Example No. | Polymerization conditions $VF_2$ used, g | | Total duration h, min | Degree of conversion % |
|---|---|---|---|---|
| | Initially | During run | | |
| 1 | 962 | 710 | 5 h 14 min | 89 |
| 2 | 970 | 702 | 5 h 20 min | 87 |
| 3 | 966 | 707 | 5 h 23 min | 92 |
| 4 | 970 | 702 | 5 h 15 min | 92 |
| 5 | 958 | 713 | 5 h 25 min | 95 |
| 6 | 825 | 0 | 4 h 19 min | 96 |
| 7 | 827 | 0 | 4 h 17 min | 97 |

TABLE III

| | Properties of the polyvinylidene fluorides | | |
|---|---|---|---|
| Example No. | APD, g/cm³ | MPS, μm | Intrinsic viscosity $[\eta]$, l/g |
| 1 | 0.77 | 115 | 0.110 |
| 2 | 0.77 | 107 | 0.107 |
| 3 | 0.76 | 113 | 0.108 |
| 4 | 0.73 | 92 | 0.107 |
| 5 | 0.74 | 107 | 0.107 |
| 6 | 0.39 | 141 | 0.110 |
| 7 | 0.39 | 129 | 0.112 |

I claim:

1. A process for reducing the formation of buildup in reactors during polymerization of vinylidene fluoride in an aqueous suspending medium with an oil-soluble radical polymerization initiator and a suspending agent consisting essentially of a methyl hydroxyethyl cellulose.

2. The process for reducing the formation of buildup in reactors during polymerization of vinylidene fluoride according to claim 1, wherein the methyl hydroxyethyl cellulose has a degree of substitution number ranging from about 1.20 to 1.80 and a molar substitution number ranging from about 0.10 to 0.30.

3. The process for reducing the formation of buildup in reactors during polymerization of vinylidene fluoride according to claim 2, wherein the methyl hydroxyethyl cellulose has a degree of substitution number ranging from about 1.40 to 1.60 and a molar substitution number ranging from about 0.13 to 0.27.

4. The process for reducing the formation of buildup in reactors during polymerization of vinylidene fluoride according to claim 1, wherein the methyl hydroxyethyl cellulose is used in a proportion of about 0.1 to 5 parts per thousand by weight relative to the total quantity of monomer used in the polymerization.

5. The process for reducing the formation of buildup in reactors during polymerization of vinylidene fluoride according to claim 4, wherein the methyl hydroxyethyl cellulose is used in a proportion of about 0.2 to 2 parts per thousand by weight relative to the total quantity of monomer used in the polymerization.

6. The process for reducing the formation of buildup in reactors during polymerization of vinylidene fluoride according to claim 1, wherein the methyl hydroxyethyl cellulose has a viscosity at 20° C. in aqueous solution at a concentration of 2% of between about 15 and 4000 mPa s.

7. The process for reducing the formation of buildup in reactors during polymerization of vinylidene fluoride according to claim 6, wherein the methyl hydroxyethyl cellulose has a viscosity at 20° C. in aqueous solution at a concentration of 2% between about 35 and 1500 mPa s.

8. The process for reducing the formation of buildup in reactors during polymerization of vinylidene fluoride according to claim 1, wherein all the methyl hydroxyethyl cellulose is used at the beginning of the polymerization by being introduced into the water before all the other ingredients of the polymerization.

9. The process for reducing the formation of buildup during polymerization of vinylidene fluoride according to claim 1, wherein the oil-soluble initiator is selected from the group consisting of dialkyl peroxydicarbonates and t-alkyl perpivalates.

10. The process for reducing the formation of buildup in reactors during polymerization of vinylidene fluoride according to claim 9, wherein the oil-soluble initiator is chosen from t-alkyl perpivalates.

* * * * *